(12) United States Patent
Macey

(10) Patent No.: US 6,817,670 B2
(45) Date of Patent: Nov. 16, 2004

(54) FOLDING SEAT ARRANGEMENT

(75) Inventor: Stuart P Macey, Carlsbad, CA (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/742,363

(22) Filed: Dec. 19, 2003

(65) Prior Publication Data
US 2004/0135417 A1 Jul. 15, 2004

Related U.S. Application Data

(60) Provisional application No. 60/439,659, filed on Jan. 13, 2003.

(51) Int. Cl.$^7$ ................................................. B60N 2/02
(52) U.S. Cl. ................................... 297/378.1; 297/341
(58) Field of Search ................................. 297/320, 321, 297/322, 341, 378.1, 317, 318; 296/65.01, 65.15, 65.09, 65.05

(56) References Cited

U.S. PATENT DOCUMENTS

| 3,957,312 | A | * | 5/1976 | Bonnaud .................... 297/341 |
| 4,043,593 | A | * | 8/1977 | Turner ........................ 297/341 |
| 4,152,024 | A | * | 5/1979 | Farelli ......................... 297/341 |
| 4,382,629 | A | * | 5/1983 | Froumajou ................... 297/322 |
| 4,805,953 | A | | 2/1989 | Yamauchi |
| 5,263,767 | A | * | 11/1993 | Asbjornsen et al. ........ 297/320 |
| 5,482,349 | A | | 1/1996 | Richter et al. |
| 5,570,931 | A | | 11/1996 | Kargilis et al. |
| 5,839,773 | A | | 11/1998 | Ban et al. |
| 5,941,602 | A | * | 8/1999 | Sturt et al. ................... 297/340 |
| 6,070,934 | A | | 6/2000 | Schaefer et al. |
| 6,099,072 | A | * | 8/2000 | Sturt et al. ..................... 297/15 |
| 6,113,191 | A | * | 9/2000 | Seibold .................... 297/378.1 |
| 6,347,834 | B1 | | 2/2002 | Couasnon |
| 6,371,558 | B1 | * | 4/2002 | Couasnon ................ 297/378.1 |
| 6,688,696 | B2 | * | 2/2004 | Brush et al. ............. 297/378.1 |

* cited by examiner

Primary Examiner—Milton Nelson, Jr.
(74) Attorney, Agent, or Firm—Ralph E. Smith

(57) ABSTRACT

A folding seat arrangement for a vehicle wherein a forward edge of a seat base is mounted to a pivoting front leg, and the rearward edge of the seat base is supported by a roller or pin riding in a longitudinal track on the load floor of the vehicle. The seat back is pivotally mounted to a fixed point on the load floor of the vehicle, and is connected to the seat base by an articulating link. The articulating link is pivotally mounted to the seat back, and to the seat base at the roller so that the lower end of the link follows the longitudinal track on the load floor of the vehicle.

5 Claims, 2 Drawing Sheets

FOLDING SEAT ARRANGEMENT

CROSS-REFERENCE TO RELATED APPLICATIONS

This application claims the benefit of U.S. Provisional Application 60/439,659, filed Jan. 13, 2003, entitled "Folding Seat Arrangement."

STATEMENT REGARDING FEDERALLY SPONSORED RESEARCH

Not applicable.

BACKGROUND OF THE INVENTION

1. Field of the Invention

The invention relates to folding seat for vehicles, and more particularly to a folding seat arrangement including an articulating link between seat base and back to coordinate folding.

2. Description of Related Art

Various arrangements of folding seats are found in vehicles. These arrangements can be cumbersome for the user, and not intuitive in the method of folding. It would be advantageous to develop a folding seat arrangement adapted to fold in a coordinated fashion.

BRIEF SUMMARY OF THE INVENTION

A folding seat arrangement for a vehicle interior comprises a seat base mounted at a forward portion to a pivoting front leg, and at a rearward portion to a roller riding in a longitudinal track adapted for mounting on a load floor of the vehicle, and a seat back pivotally mounted to a fixed point relative to the longitudinal track and connected to the seat base by an articulating link, the articulating link being pivotally mounted to the seat back and to the seat base at the roller, whereby the articulating link shifts the roller forward along the longitudinal track upon forward pivoting of the seat back.

A method of folding a seat in a motor vehicle, wherein the folding seat includes a seat base mounted at a forward portion to a pivoting front leg, and at a rearward portion to a roller riding in a longitudinal track adapted for mounting on a load floor of the vehicle, and a seat back pivotally mounted to a fixed point relative to the longitudinal track and connected to the seat base by an articulating link, the articulating link being pivotally mounted to the seat back and to the seat base at the roller, comprises the step of rotating the seat back forward so that the articulating link drives the roller forward in the longitudinal track, displacing the seat base so that it rotates forward and downward about the pivoting front leg.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

This application claims the benefit of U.S. Provisional Application 60/439,659, filed Jan. 13, 2003, entitled "Folding Seat Arrangement," which is incorporated herein by reference.

Figure 1:
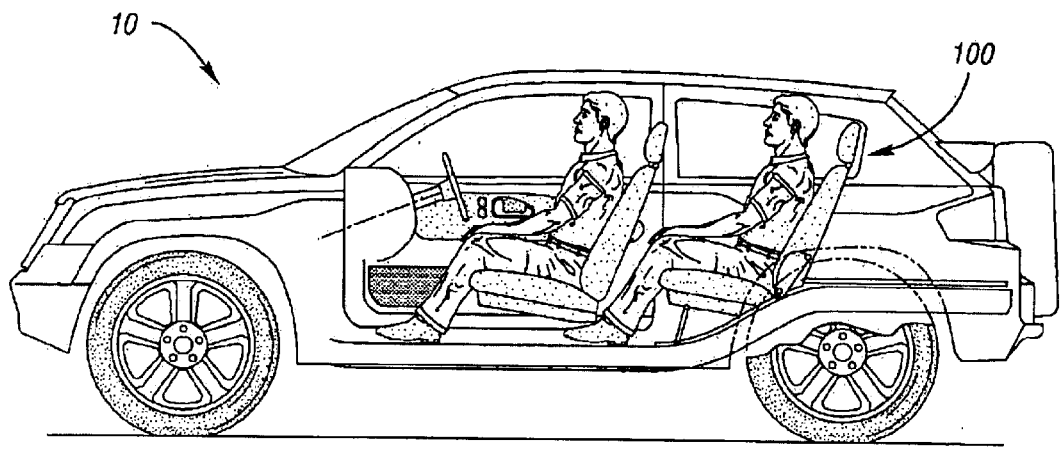
FIG. 1 is a side view of a motor vehicle with a folding seat arrangement in an upright position according to the invention.
Figure 2:
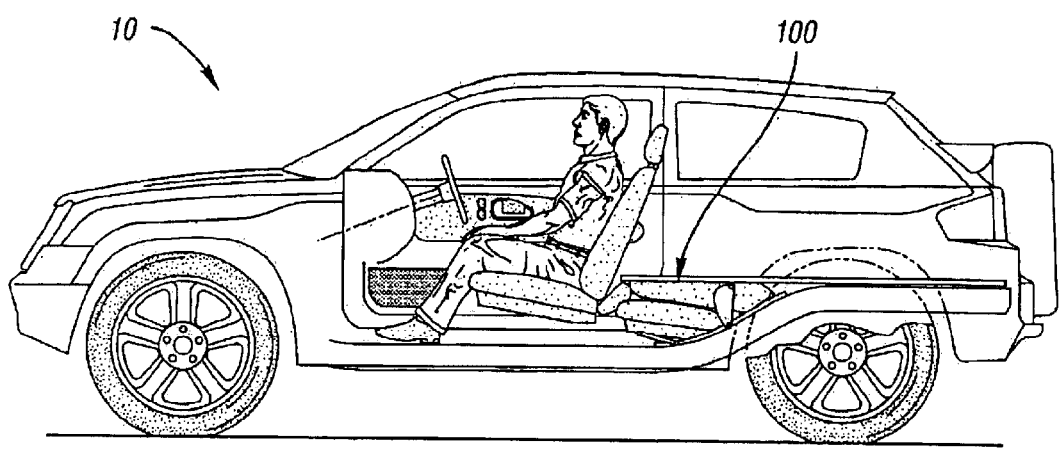
FIG. 2 is a side view of the motor vehicle of FIG. 1 with the folding seat arrangement in a folded position.

As shown in FIGS. 1–2, a folding seat arrangement 100 is configured for use in a vehicle 10. In FIG. 1, the folding seat arrangement 100 is in an upright or use position. In FIG. 2, the folding seat arrangement is in the folded position, providing the vehicle 10 with additional cargo volume.

Figure 3:
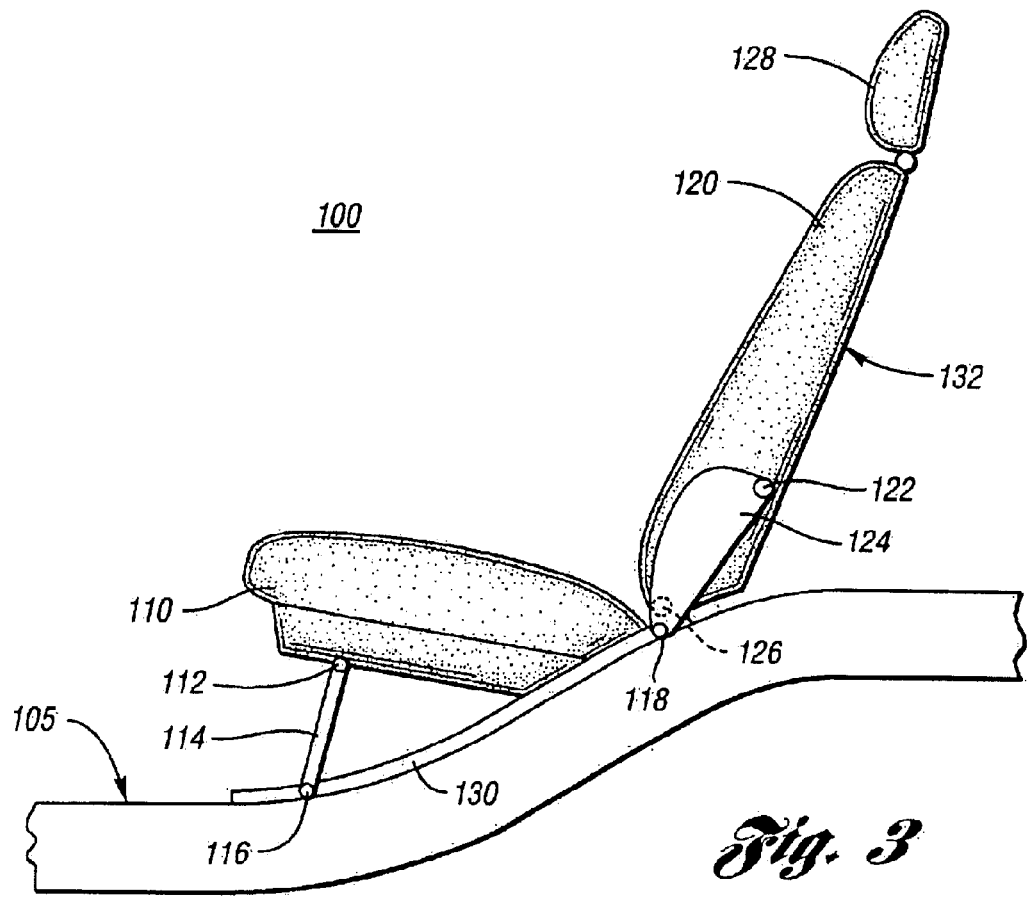
FIG. 3 is an enlarged side view of the folding seat arrangement of FIGS. 1–2 in an upright position.

Referring to FIG. 3, the folding seat arrangement 100 according to the invention includes a generally horizontal seat base 110 for supporting a passenger and a generally upright seat back 120 having a headrest 128. The folding seat arrangement 100 is adapted for mounting on a vehicle load floor 105. Specifically, the folding seat arrangement 100 includes a track 130 mounted to the load floor 105. In the disclosed embodiment, track 130 conforms closely to load floor 105 throughout its length, although this is not required.

Looking first to the seat base 110 in FIG. 3, the seat base 110 is mounted at front pivot 112 to a front leg 114. The front leg 114 is pivotally connected to the load floor 105. As shown in the figure, the front leg 114 can be connected to the track 130 at lower pivot 116 to operably connect the front portion of the seat base 110 to the load floor 105.

The rear portion of seat base 110 is connected to the track 130 by a pin or roller 118. Pin or roller 118 slides or rolls along track 130.

Seat back 120 is pivotally mounted to the vehicle load floor 105 at a fixed pivot 126. A connecting articulating link 124 is pivotally connected at an upper end 122 to the seat back 130. The articulating link 124 is pivotally connected at its lower end to the pin or roller 118 or to a pivot on a common axis with pin 118, linked to seat base 110.

Figure 4:
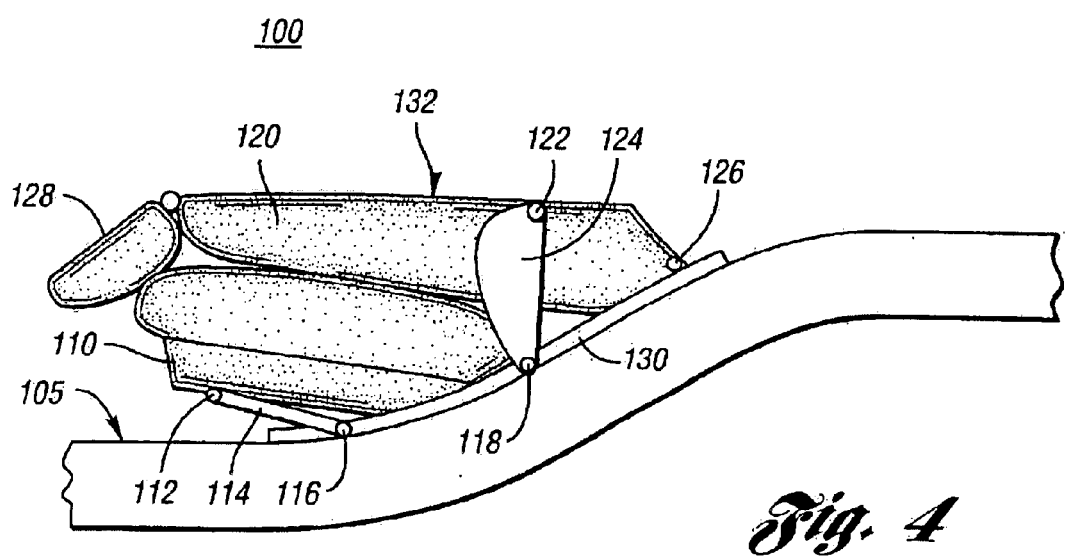
FIG. 4 is an enlarged side view of the folding seat arrangement of FIGS. 1–3 in a folded position.

Referring to FIG. 4, the seat back 120 is pivoted forward about the fixed pivot 126. As the seat back 120 pivots forward about pivot 125, link 124, pivoting on upper end 122, directs or drives pin 118 along track 130. As pin 118 travels along track 130, seat base 110 travels forward along the vehicle load floor 105. Front leg 114 pivots about lower pivot 116, lowering the front portion of seat base 110 toward load floor 105.

In the folded configuration shown in FIG. 2, seat base 110 is shifted forward and downward toward load floor 105. Seat back 120 is pivoted forward about fixed pivot 126 in concert with the forward shift of seat base 110, and seat back 120 lies face down over seat base 110. A rearward face 132 of seat back 120 functions as an upwardly facing load surface with seat back 120 in this folded position.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A folding seat arrangement for a vehicle interior, comprising:

a seat base mounted at a forward portion to a pivoting front leg, and at a rearward portion to a roller riding in a longitudinal track adapted for mounting on a load floor of the vehicle; and a seat back pivotally mounted to a fixed point relative to the longitudinal track and connected to the seat base by an articulating link, the articulating link being pivotally mounted to the seat back and to the seat base at the roller, whereby the articulating link shifts the roller forward along the longitudinal track upon forward pivoting of the seat back.

2. The folding seat arrangement of claim 1, wherein the fixed pivot is offset from the longitudinal track.

3. The folding seat arrangement of claim 1, wherein the seat base shifts forward about the pivoting front leg upon the roller shifting forward along the longitudinal track.

4. The folding seat arrangement of claim 3, wherein the seat base further shifts downward about the pivoting front leg.

5. A method of folding a seat in a motor vehicle, wherein the folding seat includes a seat base mounted at a forward portion to a pivoting front leg, and at a rearward portion to a roller riding in a longitudinal track adapted for mounting on a load floor of the vehicle, and a seat back pivotally mounted to a fixed point relative to the longitudinal track and connected to the seat base by an articulating link, the articulating link being pivotally mounted to the seat back and to the seat base at the roller, the method comprising the step of rotating the seat back forward so that the articulating link drives the roller forward in the longitudinal track, displacing the seat base forward and downward about the pivoting front leg.

* * * * *